United States Patent
Yee et al.

(10) Patent No.: US 8,407,669 B2
(45) Date of Patent: Mar. 26, 2013

(54) DEVICE BASED SOFTWARE AUTHORIZATIONS FOR SOFTWARE ASSET MANAGEMENT

(75) Inventors: John Leong Yee, San Mateo, CA (US); Jason Aron Alonzo, Fair Oaks, CA (US); Umesh Madhav Apte, San Ramon, CA (US); Ann Catherine Scullion, Livermore, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1192 days.

(21) Appl. No.: 11/828,234

(22) Filed: Jul. 25, 2007

(65) Prior Publication Data

US 2009/0031286 A1    Jan. 29, 2009

(51) Int. Cl.
*G06F 9/44*    (2006.01)
(52) U.S. Cl. .......................................... 717/120
(58) Field of Classification Search ............... 717/120
See application file for complete search history.

(56) References Cited

U.S. PATENT DOCUMENTS

| | | | | |
|---|---|---|---|---|
| 5,138,712 A * | 8/1992 | Corbin | | 717/176 |
| 6,056,786 A * | 5/2000 | Rivera et al. | | 717/168 |
| 6,421,571 B1 | 7/2002 | Spriggs et al. | | |
| 7,013,294 B1 * | 3/2006 | Sekigawa et al. | | 705/59 |
| 7,085,822 B1 * | 8/2006 | Donatelli et al. | | 717/173 |
| 7,313,512 B1 * | 12/2007 | Traut et al. | | 717/138 |
| 7,480,669 B2 | 1/2009 | Lo et al. | | |
| 7,568,018 B1 * | 7/2009 | Hove et al. | | 709/221 |
| 7,752,139 B2 * | 7/2010 | Hu | | 705/59 |
| 7,809,648 B2 * | 10/2010 | Misra et al. | | 705/59 |
| 7,890,950 B1 * | 2/2011 | Nanavati et al. | | 717/174 |
| 2003/0055749 A1 | 3/2003 | Carmody et al. | | |
| 2003/0154199 A1 | 8/2003 | Thomas et al. | | |
| 2004/0030564 A1 * | 2/2004 | Hartinger et al. | | 705/1 |
| 2004/0117784 A1 * | 6/2004 | Endoh | | 717/169 |
| 2005/0257209 A1 * | 11/2005 | Adams et al. | | 717/168 |
| 2006/0111874 A1 | 5/2006 | Curtis et al. | | |
| 2006/0178954 A1 | 8/2006 | Thukral et al. | | |

(Continued)

FOREIGN PATENT DOCUMENTS

| | | |
|---|---|---|
| EP | 1 811 442 A1 | 7/2007 |
| EP | 1818823 A2 * | 8/2007 |

OTHER PUBLICATIONS

Laszewski et al. , "A Repository Service for Grid Workflow Components", 2005, IEEE.*

(Continued)

*Primary Examiner* — Wei Zhen
*Assistant Examiner* — Junchun Wu
(74) *Attorney, Agent, or Firm* — Kilpatrick Townsend & Stockton LLP

(57) ABSTRACT

Software device groups allow owners and administrators to be defined for various intelligent devices, instead of tracking by primary user. A software license compliance management system obtains discovery information for these devices to determine software installed or active on these devices. The management system also obtains the number of licenses for each software package and determines whether the software is in compliance, or if the number of instances exceeds the number of licenses. This determination is flexible and can handle various license types, such as per user, per device, and per processor. For any exception, the group owner is informed and then can re-allocate licenses, purchase additional licenses, or request the uninstalling of a software instance(s). Device groups also can include sub-groups with sub-group owners responsible for handling any exception in that sub-group.

26 Claims, 9 Drawing Sheets

U.S. PATENT DOCUMENTS

| | | | |
|---|---|---|---|
| 2006/0282519 A1* | 12/2006 | Trevathan et al. | 709/223 |
| 2007/0061393 A1 | 3/2007 | Moore | |
| 2008/0104532 A1 | 5/2008 | Stambaugh | |
| 2008/0183626 A1* | 7/2008 | Romero et al. | 705/59 |
| 2008/0243921 A1 | 10/2008 | Ellisor | |
| 2008/0244091 A1 | 10/2008 | Moore et al. | |
| 2008/0320486 A1 | 12/2008 | Bose et al. | |
| 2009/0063559 A1 | 3/2009 | Rhodes et al. | |
| 2009/0138792 A1 | 5/2009 | Cudich et al. | |
| 2009/0249446 A1 | 10/2009 | Jenkins et al. | |
| 2009/0276771 A1 | 11/2009 | Nickolov et al. | |
| 2009/0300098 A1 | 12/2009 | Millmore et al. | |
| 2011/0087601 A1 | 4/2011 | Apte et al. | |
| 2011/0087604 A1 | 4/2011 | Chung et al. | |
| 2011/0154370 A1 | 6/2011 | Yu | |

OTHER PUBLICATIONS

Trask et al., "RIGR—A Repository Model Based Approach to Management", 2001, Colorado State University.*

"Asset Life Cycle Management," Provence Technologies Inc., [online], 2008, [retrieved Mar. 13, 2009]. Retrieved from: http://www.provance.com/en/Products/Asset_Life_Cycle_Management.html, 2 pages.

"Centralizing and Qualifying IT Business Data," Blazent, Inc., 2008, [retrieved Jul. 19, 2011], Retrieved from: http://web.archive.org/web/20090617000058/http://www.blazent.com/downloads/WP%20-%20IT%20Business%20Data.pdf, 12 pages.

"Peregrine Systems Introduces Asset Tracking Solution as a Foundation for Enterprise Lifecycle Asset Management," PR Newswire, [online], Sep. 21, 2004, [retrieved Mar. 13, 2009], Retrieved from: http://www/prnewswire.com/cgi-bin/stories.pl?ACCT=104%STORY=www/story/09-21-2004-0002255542&EDATE, 3 pages.

Computer Associates International, Inc., "Unicenter Asset Management Release 4.0," 2004, 6 pages.

Kaushik, P., "Micro-Blogging for Businesses: Mini Version of Blogs: Modern Tool for Creating Product Awareness," [online], Jan. 4, 2009, [Retrieved on Jul. 18, 2011]. Retrieved from: http://www.suite101.com/content/microblogging-for-businesses-a88090, 3 pages.

MacDonald, J., "Intelligent Middleware in the Realtime Enterprise," [online] Apr. 1, 2010, [retrieved on Jul. 19, 2011], Retrieved from: http://www.enterpriseirregulars.com/15799, 3 pages.

Maisami, Y., et al., "Boost Productivity and Collaboration with Enterprise Micro-Blogging," [online] Copyright 2005-2011, [retrieved on Jul. 18, 2011]. Retrieved from: http://myarticlearchive.com/articles/10/007.htm, 2 pages.

Milstein, S., "@Dell Outlet: Raising Awareness, Increasing Sales, Measuring Results," Twitter 101 for Business—A Special Guide (Print version), pp. 12-13.

Mitchell, T., et al., "Extending Altiris Inventory Solution," Dell Power Solutions, [online], May 2005, Retrieved from: http://www.dell.com/downloads/global/power/ps2q05-20050146-Altiris.pdf, 4 pages.

U.S. Appl. No. 12/576,988, filed Oct. 9, 2009, Final Office Action mailed May 11, 2011, 15 pages.

U.S. Appl. No. 12/576,988, filed Oct. 9, 2009, Office Action mailed Sep. 1, 2010, 11 pages.

U.S. Appl. No. 12/973,393, filed Dec. 20, 2010, Office Action mailed Jul. 6, 2011, 14 pages.

U.S. Appl. No. 12/576,988, filed Oct. 9, 2009, Advisory Action mailed Jun. 8, 2012, 2 pages.

U.S. Appl. No. 12/576,988, filed Oct. 9, 2009, Office Action mailed Jul. 20, 2012, 13 pages.

U.S. Appl. No. 12/973,393, filed Dec. 20, 2010, Office Action mailed Jun. 28, 2012, 13 pages.

U.S. Appl. No. 12/576,988, filed Oct. 9, 2009, Advisory Action mailed Aug. 5, 2011, 3 pages.

U.S. Appl. No. 12/576,988, filed Oct. 9, 2009, Final Office Action mailed Mar. 2, 2012, 13 pages.

U.S. Appl. No. 12/576,988, filed Oct. 9, 2009, Office Action mailed Sep. 2, 2011, 13 pages.

U.S. Appl. No. 12/973,393, filed Dec. 20, 2010, Final Office Action mailed Jan. 23, 2012, 14 pages.

* cited by examiner

Define Software Device Groups

202 → Group Id: CEO
204 → **\*Description:** CEO's Group
206 → **\*Group Owner Id:** IXHEEE132  Chen,Devon

Source From ARM No ▼     Update ARM Custodian On Save
Fetch From ARM                                         No / Yes

Group Members

| Include | #Member | Description | CPU | Owner | Name |
|---|---|---|---|---|---|
| 1 Device ▼ | 00C0D010401F | ITTAG132 | 3 | KUTZ485 | James,Sarah |
| 2 Group ▼ | CFO | CFO's Group | | IXHEEE160 | Maertens,Betsy |
| 3 Group ▼ | CIO | CIO's Group | | IXHEEE201 | Smith,Charles |

Declare Device Licenses   Define Software Titles/Users

Save | Return to Search | Previous in List | Next in List | +Add | Update Display

FIG. 2

Define Software Titles/Users

Software Title: Adobe Photoshop

Software Publisher: TV0000045 🔍 Adobe Systems, Inc. ← 404

License Type: Installation ← 406

Installations Per User: 1

☑ Track Requisition
☑ Permission Required

← 402 (Software Title)

Software Authorization

Customize | Find | ▦ | First ◀ 1-4 of 4 ▶ Last

| | *Authorize | *Value | Description | Count Licenses | *Licenses Per User | Authorized Licenses | | |
|---|---|---|---|---|---|---|---|---|
| 1 | Device Group ▼ | CEO 🔍 | CEO's Group | ☐ | | 4 | + | − |
| 2 | Employee ▼ | IXHEEE111 🔍 | Unger, Randy | | 1 | | + | − |
| 3 | Employee ▼ | IXHEEE120 🔍 | Crawford, William | | 1 | | + | − |
| 4 | Employee ▼ | IXHEEE128 🔍 | Masterson, Carlos | | 1 | | + | − |

← 408

🔍 Return to Search | ↑ Previous in List | ↓ Next in List | ≡ Notify

💾 Save | ➕ Add ← 410 | 🔄 Update/Display

FIG. 4

DEVICE BASED SOFTWARE AUTHORIZATIONS FOR SOFTWARE ASSET MANAGEMENT

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the management of assets, and more particularly to a device-based approach for managing software licenses and ensuring license compliance.

As businesses become more and more reliant upon large numbers of computerized devices and a wide variety of software packages, it is increasingly difficult to track hardware and software inventory for a given entity. Further complicating the problem is the fact that each software package might have a different licensing approach, such as one license per user, per machine, or per processor, such that it can be very difficult to ensure that the entity is in compliance with all the various licenses for the various packages and devices.

In one current approach, companies utilize software packages from various "discovery" vendors. The discovery vendor software typically is installed on, or pushed onto, information technology (IT) devices such as a server, desktop, or laptop. The discovery software performs an inventory scan of the device, and reports back information such as the device manufacturer, model, serial number, etc. The discovery software also can report back on the various software installed and/or activated on the device. The reported data thus can be used to determine where the software is installed, and as well as how many instances of the software are installed across the entity. A problem with existing approaches, however, is that the installation or usage model has traditionally been employee-based. In other words, an instance of installed software was tied to an employee using that machine.

For example, a product such as PeopleSoft IT Asset Management (ITAM), available from Oracle Corporation of Redwood Shores, Calif., integrates data from third party Discovery vendors, where the vendor solutions discover and take inventory of intelligent IT devices connected to an organization's network. The information obtained includes details and/or attributes about each IT device, such as the manufacturer, model, machine name, installed software, serial number, and the primary user of the device. Prior releases of the ITAM product support an employee-based software authorization model, such as is discussed above. In this example, the Network user ID of the primary user of an IT device is mapped to an Employee ID. The software installed on an IT device can then be linked to the employee or end user of the software title. A physical count of the number of IT devices on which the software is installed can be compared with the number of software licenses purchased by the organization. This information thus provides a vision into the organization's software usage. Ultimately this information is used to determine overall software compliance, as an organization should not consume more licenses than it has purchased.

An employee-based model is not appropriate in all situations, however. For example, an IT device may require additional attention due to factors such as the expense of the machine, the software installed thereon, or the way in which the machine is used. Further, such machines may be owned by a specific department (e.g., Finance) or person, but the device may be administered and maintained by someone in the IT department. The IT personnel may not be the "primary user" of the device, as the personnel would only have minimal access to the machine for periodic maintenance and service, and are only responsible for the content and operation of the device (i.e., "Content Managers"). In some scenarios a Content Manager may be the "primary user" of the device, as a Content Manager may log in to the device (e.g., for maintenance) more often than any other user. However, the ownership of the device, from a financial standpoint, would likely reside in another department outside of the Content Manager's department. For example, even though an IT user might log in more often than any other user, it is unlikely that the IT department would "own" an IT device in the Finance department.

Thus there is a problem with existing discovery approaches, as an IT device might not belong to the user or group using it the most, such as technicians out on the shop floor, yet the "discovery" information ties that machine to that user or group. Furthermore, because licenses can tie to multiple processors on a machine, or multiple users for a machine, simply tying a machine to a user does not provide sufficient information for all licensing and compliance scenarios.

BRIEF SUMMARY OF THE INVENTION

Systems and methods in accordance with various embodiments of the present invention provide for the easy and automatic determination of compliance with various types of software licenses. Embodiments can take advantage of existing discovery and asset information and utilize the notion of device groups and group owners to provide a flexible and extensible architecture for software compliance and reconciliation.

In one embodiment, a series of device groups is defined for an entity, wherein each device and user is assigned to a device group. Each group can contain sub-groups as well as devices that are specific to that group. Each device group and sub-group also is assigned a group owner responsible for devices and users in that group. This device-based approach moves away from prior approaches wherein devices and software were tracked by primary user, which as discussed above is not optimal for various reasons.

A group owner, compliance manager, or other user can run a compliance application. The application can be run manually, or can be set to run automatically at specified times or intervals. The compliance manager obtains discovery information for each device from an existing discovery repository. The discovery software can attempt to obtain updated information, or can provide the most recent information for the various devices across the entity. The discovery information includes information about each device as well as any software package active on the device. The compliance manager also obtains asset, financial, and/or licensing information including the number of licenses available to the device group for each software package from an appropriate asset repository.

The compliance manager systematically compares the discovery information and asset information to determine whether all detected software packages are in compliance, or if there is an exception where the number of installed or active instances of a software package exceeds the number of licenses for that package. In one embodiment, a list of any exceptions is generated that is sent to the group owner and any other appropriate individual. In other embodiments, a message or alert is generated for each group owner or sub-group owner for whose group an exception was detected.

Upon being notified of an exception, the respective owner can access the compliance manager interface and view the software packages and instances determined to be out of compliance. The owner then can determine whether any additional licenses are available or whether licenses can be re-allocated or instances uninstalled in order to resolve the exception. The owner also can have the ability, in some embodiments, to request or purchase additional licenses and allocate these additional licenses. In a sub-group hierarchy, a group owner also can re-allocate licenses between sub-groups in order to ensure that each sub-group is in compliance. A system can be configured such that if it is necessary to uninstall or deactivate an instance, a message or notification could be generated and sent to the appropriate device owner.

When a device group is initially defined, the group can be sourced automatically and/or manually. For example, in a group hierarchy where the bottom layer is a set of devices, those devices can be sourced automatically from an asset repository, for example. Other layers, such as sub-groups of other sub-groups, may not readily be determined from the asset or other data and may need to be added manually.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which:

FIG. 2 illustrates an exemplary interface that can be used to define software device groups in accordance with one embodiment of the present invention;

FIG. 4 illustrates an exemplary interface that can be used to authorize software packages in accordance with one embodiment of the present invention;

DETAILED DESCRIPTION OF THE INVENTION

Systems and methods in accordance with various embodiments can overcome the aforementioned and other deficiencies in asset management and tracking systems by changing the way in which assets such as software assets are assigned ownership and/or allocated.

In one embodiment, software "device groups" are created that define the owner and/or administrator of an IT device. This owner or operator can be, for example, a content manager or group head. In order to correlate a device with a group, the reported discovery data is used to determine the serial number for each intelligent network device. Rather than use the Primary User/Employee ID mapping used previously with the employee software authorization model, the serial number from each IT device is associated with a device group that is administered by a Content Manager. In one embodiment the Content Manager can be identified by an Employee ID. The IT devices or assets then can be reconciled using a device-based model, which associates the software titles installed on the device to the machine itself, as well as the associated software device group, and not to the primary user.

Figure 1:
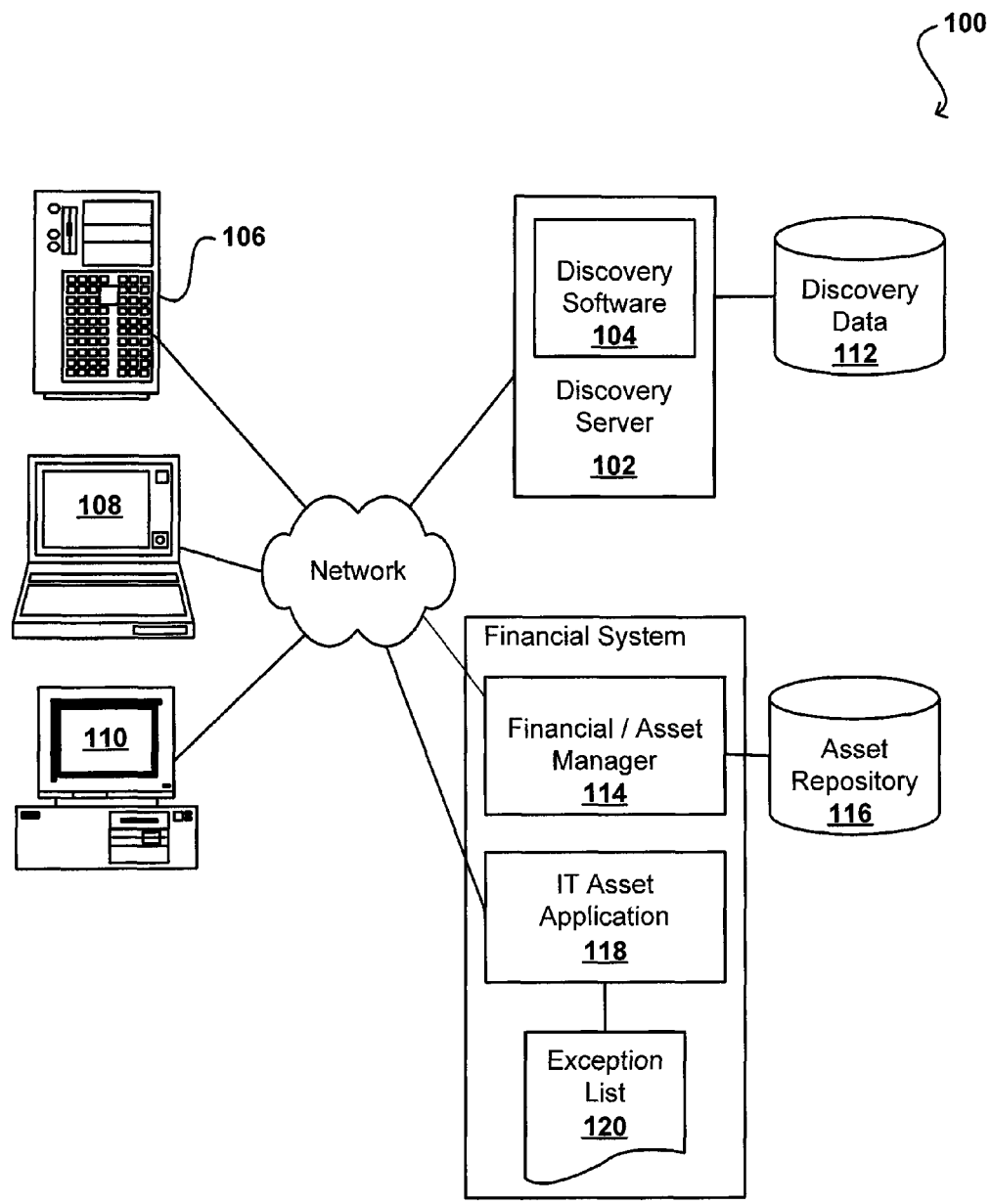
FIG. 1 illustrates a system that can be used for license and installation reconciliation in accordance with one embodiment of the present invention.

FIG. 1 illustrates an exemplary configuration 100 that can be used for the discovery and reconciliation of assets for a given entity. In this example, an instance of the discovery vendor software 104 is installed on a server 102 of other device across the network for the entity. In some embodiments, the software may be installed remotely or may have at least one component installed on each device to be monitored. The vendor software 104 can communicate with each appropriate intelligent device, such as a server 106, laptop 108, or desktop 110, and can gather "discovery" information such as serial number, number of processors, installed software, etc. This discovery information then can be written to a discovery data store 112. A separate financial system device 114, from which asset data can be obtained, is used to gather financial asset information and store that information to an asset repository 116. Once the discovery and asset information is obtained, an IT asset management (ITAM) application 118 can query and analyze the data in the discovery data store 112 and asset repository 116 in order to reconcile the number of devices and software installations (from the discovery data) with the number of software licenses (from the asset repository). After doing the reconciliation, the ITAM application 118 can generate a list of exceptions 120, such as software titles for which the number of allocatable licenses has been exceeded. The list can take any appropriate form, such as a report or spreadsheet generated for review, or can include at least one message sent to a user or owner responsible for the software instance responsible for an exception.

The discovery software 104 does an inventory of intelligent devices across the entity network, within an entity domain, or using specified address ranges, to obtain inventory information for each such device. An example of such discovery software is the Altiris Network Discovery package presently available from Symantec Corporation of Cupertino, Calif. This information, relating to physical inventory for an entity, then can be compared with the financial books or information for the entity, stored in the asset repository 116 in this example. The financial information can be gathered and maintained by any appropriate product, such as PeopleSoft Enterprise IT Asset Management (ITAM) available from Oracle Corporation of Redwood Shores, Calif. A data store for a product such as ITAM typically revolves around the asset management tables or solution, and provides information such as the net book value of an IT asset given depreciation, etc.

The discovery software can be configured to obtain and update inventory information at specific intervals or times, such that usage and instances of software packages can be tracked and/or monitored over time. As discussed above, prior solutions tracked software and devices by employee. It has been determined to be more desirable in many instances to track servers or machines that do not really "belong" to the people who are using them most in a way that is more useful for the entity. Simply tracking information such as the user who logs in the most for a given machine is not sufficient to provide for proper asset management. In one embodiment, each machine is tied to what is referred to as a "group owner" or "asset owner," rather than the employee who most uses the machine. A group owner, for example, can have information that is tied back to a specific employee ID in, for example, a Human Capital Management (HCM) system, and can make the connection between the actual owner of the device, the department, group, and/or other information that might be stored in a Human Resources (HR) database. When reconciliation is made between the physical software installations from the discovery data and the available licenses from the asset repository, then, if there is an exception where the number of installations exceeds the number of licenses, for example, the system can readily determine the proper group owner to contact regarding the exception. Further, an entity can easily reallocate licenses between Group Owners as will be discussed later herein.

The ability to easily monitor and reconcile physical assets such as software installations with information on the financial books is something that prior solutions have not offered or addressed. Presently, companies periodically compare information by manually creating spreadsheets and determining where licenses might be needed or exceeded. This also requires manual updating to keep the information relatively current. Such an approach is time consuming, and presents opportunity for error. Further, the person generating the spreadsheet typically will not be familiar with the different types of licenses and hence might not be able to properly determine whether the entity is actually in compliance. Also, employees often transfer or are subject to turnover, such that it also is necessary to update owner information that might not be readily obtainable from the discovery information alone.

A system in accordance with one embodiment utilizes the Group Owner or Asset Owner information to not simply discover information as in existing systems, including information such as device serial number, device manufacturer, primary user, and location, but can discover and correlate additional information, such as business unit, department, custodian, location, software installations and configurations, as well as various user-defined parameters. The system can integrate and validate the data, followed by compliance evaluation and summary steps. The system then can notify and/or display the results and any exceptions to an administrator or compliance user, as well as to any Group or Asset owner, particularly when that owner might be out of compliance. As part of the presentation layer, the system can include an exception workbench interface that allows users to execute various transactions to facilitate re-allocation of licenses between groups. In one embodiment, a third party software package can redistribute licenses based on recommendations from the system. Such a solution is flexible as compliance can be ensured with a large variety of types of software license (e.g., per instance, per user, per machine, per CPU, etc.). Various software metrics can be used to enable an asset manager to effectively monitor and control specified software licenses within an enterprise, allowing the manager to report and address compliance issues online. Reports can be used to show compliance and address issues before an audit of the enterprise, for example.

As discussed above, one approach is to authorize software by device using device groups. FIG. 2 illustrates an exemplary interface 200 useful for defining software groups in accordance with one embodiment. In this interface, a device group will show a Group ID that will be used to track information in the asset repository and for reconciling discovery information. The interface allows a user to specify a Group Owner 204, or Content Manager, for that device group, who will be ultimately responsible for devices in that group. The Group Owner can be tracked by Owner ID, which can be linked to, or the same as, the corresponding Employee ID. The Content Manager can be used for workflow associated with the group, as well as the devices in the group. This interface also can be used to associate all appropriate IT Devices requiring device-based software authorizations to the selected device group. The interface can have an option 206 to select the devices and/or group members automatically from an asset repository management (ARM) database. The members of the group appear in a Group Members section 208. Another option is to source the group dynamically. The Group members in such an embodiment are defined by the asset repositories custodian information. The criteria selects all Assets where the custodian is the same as the Group Owner Id.

Figure 3:
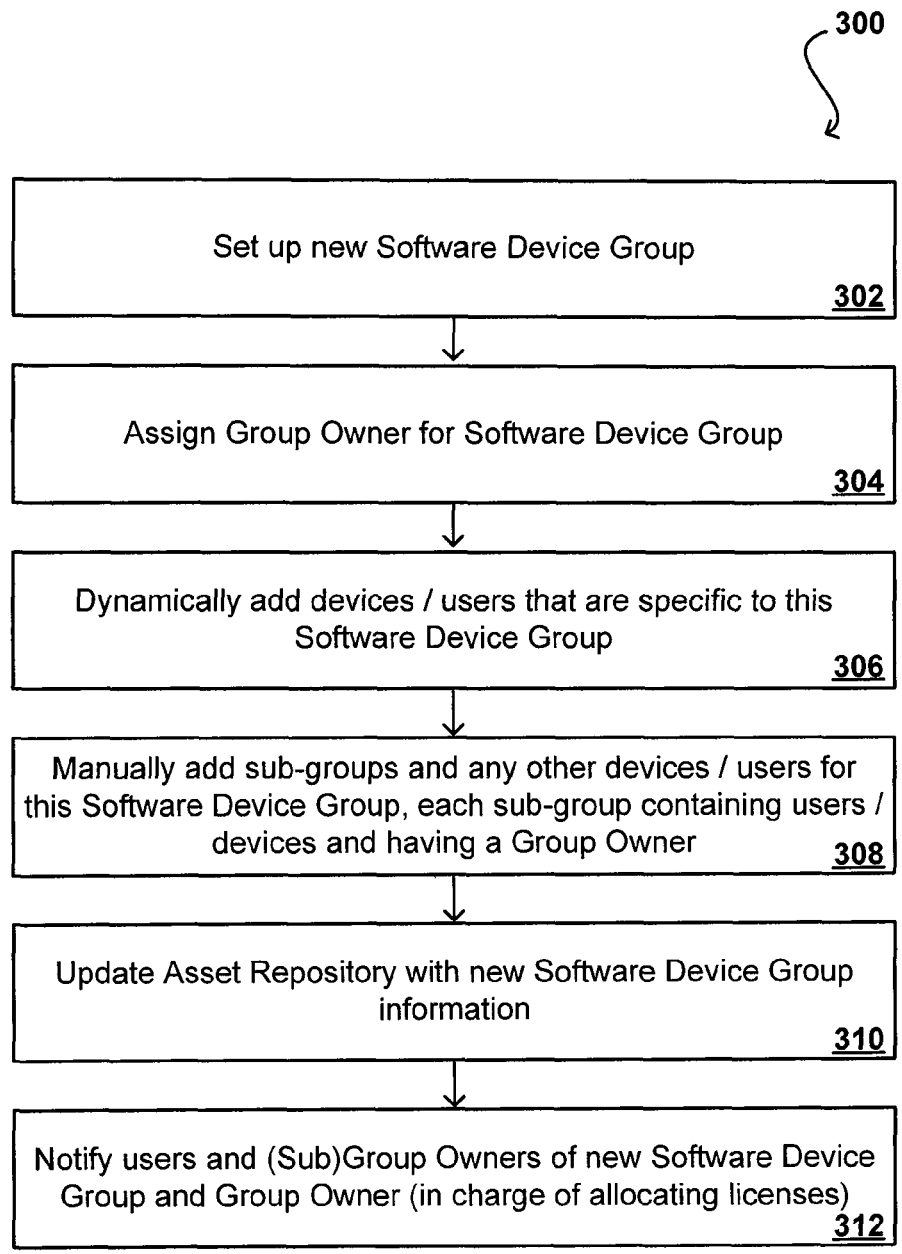
FIG. 3 illustrates steps of a method for defining software device groups in accordance with one embodiment of the present invention.

FIG. 3 illustrates steps of an exemplary process 300 for setting up a software group that can utilize the interface of FIG. 2. In the process, the new Software Device Group is set up 302, such as by selecting an option "New-Group" from a Device Group interface. Once a new group is formed, an interface such as that shown in FIG. 2 can be used to assign a Group Owner for the new Device Group 304, such as by manually entering or searching for an identifier for the Group Owner. The user defining the Group then can choose to add devices, users, and sub-groups, doing so manually, automatically, or a combination thereof. A dynamic selection can be used to fully source the device group 306, or at least to define an initial set whereby additional sub-groups or devices can be added manually. If the option is selected to source from ARM, for example, the grid is auto-populated with assets where the Group Owner Id is the asset custodian of record in the asset repository. Independent of whether an initial set of members is dynamically added from the system, a user can manually select users, devices, and sub-groups to be added to the Device Group 308. As can be seen in the example of FIG. 2, the CEO group includes one device with a particular Member ID and Description, although any appropriate identifying information could be used. Each Group Member entry also shows the Owner of that Device or Group. In one embodiment every bottom node is dynamically, but all others are manually entered. For example, the member devices of a bottom level sub-group can be determined dynamically from the asset repository data, but the other groups to which that subgroup belongs may have to be entered manually. For instance, there may be no way from the discovery data to determine that devices of a compliance group fall under a Legal sub-group under a CEO group. Once the Group is fully defined, the information can be updated in an asset repository 310 or other appropriate location. Any members or sub-group owners then can be modified of the new group and their membership therein 312.

Other information can be listed as desirable for compliance and/or tracking issues. For example, the device entry in FIG. 2 shows that the device owned by Sarah James includes three processors. Devices such as servers are particularly likely to have more than one physical or virtual CPU. This information can be important for compliance issues, as certain software license vendors require one license per machine or user, while others require additional licenses to be purchased for each of these CPUs. So the device might only require one license for software package A, but might require three licenses for software package B. The ability to automatically track by device and CPU, including automatic updates when a CPU is added or removed, is an advantage that has not been provided in prior such packages. Furthermore this feature provides for the possibility of one IT asset consuming a different number of licenses for different software. For example, a server with 16 physical CPUs may authorize Oracle database licenses for 10 CPUs, while only authorizing IBM database licenses for 8 of them.

Another advantage to an interface such as that of FIG. 2 is the ability to add sub-groups to a device group. The ability for a group to include individual devices as well as other groups as members creates a group hierarchy. For example, the CEO Device group is shown to include the CFO device group and the CIO device group, and indicates the owner of each sub-group. In this way, a device group can add an entire group as a sub-group, which allows the Device Group to be notified of non-compliance of any of its sub-groups, without having to manually enter, track, and update the individual devices and members of each sub-group. Further, the overall Device Group might have a total number of allocated licenses for a software product, and can allocate the licenses to different sub-groups. In this way, a sub-group leader who might exceed the allotted licenses for that sub-group can be allocated additional licenses from the Device Group Owner, for example, and will not mistakenly think it necessary to purchase additional software licenses for the particular sub-group. Further, this interface allows the Device Group owner to easily get an overview of compliance without being overwhelmed with details of each sub-group that are not necessary to view for compliance reasons.

The nesting of devices and groups produces a hierarchical structure that allows for software usage to be authorized at a group level and aggregated for the highest-level groups. The solution provides a high level metric that provides an at-a-glance look at which groups are over or under utilizing the software licenses assigned to them. The interface of FIG. 2 also allows a user the options of declaring device licenses and defining software titles or users. Such options allow information to be viewed, entered, or updated so that particular software packages can accurately be matched with the corresponding licenses, and the type of license can be specified and updated appropriately. An option such as "Update ARM Custodian on Save" allows updating the devices with the Group Owner as the asset custodian of record in the asset repository.

Once a device is added to a Device Group the integration and mapping process can disregard the primary user of the device since the device is flagged as device-based, thus requiring use of the serial number for software authorizations. The process then can associate the software usage with the device and the device group. Additionally, the process can use the Content Manager's Employee ID for notifications rather than the Employee ID associated with the Primary User of the IT device. For example, when the ITAM Manager needs to have software un-installed on a "special" IT device, the ITAM Manager will be able to contact the person who is actually in charge of the un-installing of the software.

When using dynamic groups, a significant advantage to such an approach is that it is not necessary to go into the software continually and maintain a group. Once the custodian is set up properly, the device group will be automatically rendered each time that group is queried. It is not necessary to maintain the groups as in past, which included physically going in and changing the members of the group each time those members changed. Further, each sub-group updates itself, so that if the CEO group contains only the CIO and CFO groups, the sub-groups of the CEO group will never change, even though the individual members of those sub-groups might change quite often.

FIG. 4 illustrates another interface page 400 wherein software can be authorized by employee, employee group, or device group. As can be seen, the authorization can be given for a specified software package 402. For this particular package, a user can select the type of license 404 for this particular software vendor. For example, the license types might be per installation, per user, per CPU, per machine, etc. In this example, the license type option "Per Installation" is selected. When the option is selected, the available options 406 can change accordingly. For example, with the "installation" option, a Group Owner or user can specify that each user can only have one installation. This could mean, for example, that a user having a licensed installation on a desktop is not authorized to also have one on a laptop. If that machine has four physical CPUs that are hyper-threaded, then if that software vendor instead required licenses by CPU then that machine or user may instead require 8 licenses. Since different vendors have different schemas for how they count licenses, this functionality allows a user to manipulate the appropriate counting scheme for each software title. In other systems, the licensing scheme may be entered elsewhere across the enterprise and simply retrieved into the correlation and compliance software.

Once the software title and license type are selected, the software authorization grid 408 can be used to allocate and authorize the software. For example, a group might have a certain number of licenses allocated for that software package. This number can be entered manually or retrieved from a management database, for example. The Content Manager or Group Owner then can manage those licenses at a lower level. In FIG. 4, the CEO Group Owner can see that the owner has four licenses to dole out. For example, Oracle database licenses by not physical CPU but by virtual CPU.

The system can utilize the discovery information to determine the instances where this software is installed across the enterprise. The information then can be automatically displayed in the grid, in this example showing the three installations and corresponding authorized employees or users, with one license per user. Also shown is an "add" option 410, whereby another employee can be authorized for an installation before an installation actually takes place. Such functionality prevents a user from allocating a license to an employee or device when that license has actually been earmarked for someone or something else, resulting in having more installations than licenses.

A user can also use this interface to manipulate the allocated licenses. For example, if Randy Unger completes a project or moves to another department or group, this interface allows the user to remove the license from Randy Unger and assign the license to another employee if desired. The interface has a notification option that can be used to notify the Group Owner, etc., that the software also should be uninstalled from Randy's machine. The interface also can allow the user to drill down inside a particular group to see the individual devices, employees, etc., if desired. A Group Owner may always have access to see the information of the sub-groups, but a sub-group owner might not have access to information for other sub-groups or at the group level(s) higher in the hierarchy. A Group Owner also can assign or allocate numbers of licenses to different sub-groups, whereby a sub-group leader can allocate the licenses to the members of that sub-group.

Figure 5:
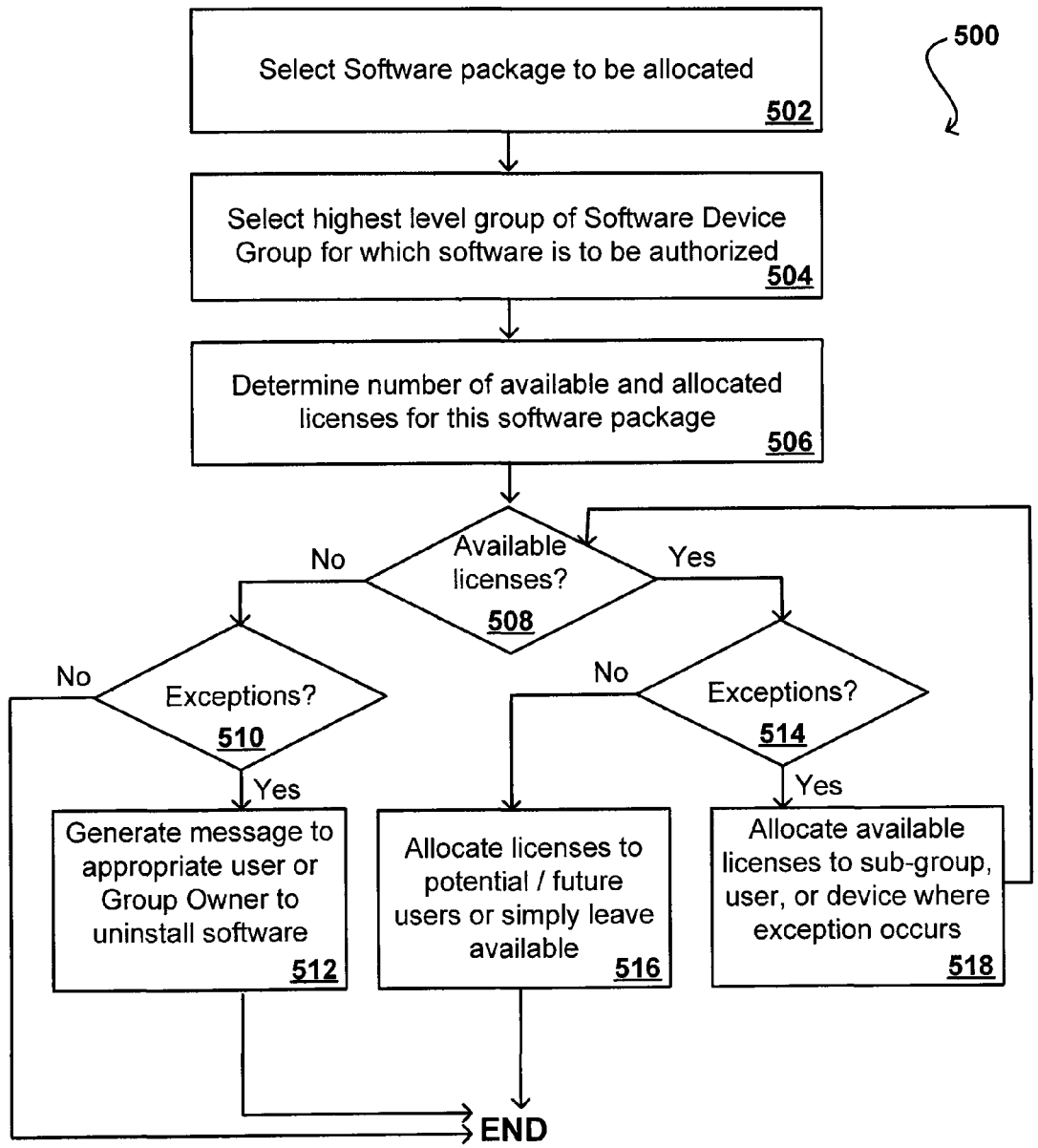
FIG. 5 illustrates steps of a method for allocating software licenses in accordance with one embodiment of the present invention.

FIG. 5 illustrates steps of an exemplary process 500 for allocating software licenses that can utilize an interface such as that shown in FIG. 4. In this process, the software package having licenses to be allocated is first selected 502. A user can then optionally select the highest group level for which software is to be authorized 504, or can simply select the Device Group where the licenses will be allocated. A determination can be made of the number of allocated licenses, the total number of licenses, the number of installations, and/or the number of available licenses 506. A determination is made as to whether there are available licenses 508, and if not a determination is made as to whether there are any exceptions 510. If there are exceptions and no available licenses, a message can be generated to inform the appropriate user or Group Owner that at least one software instance should be uninstalled or deactivated, at least until another license can be obtained 512. If there are available licenses, a determination can still be made as to whether there are any exceptions 514, and if not then licenses can be allocated to future or potential users, and/or the licenses can simply be left available 516. If there are licenses available and there are also exceptions, then licenses can be allocated (as available) to the particular user, device, or sub-group where the exception occurs 518.

Figure 6:
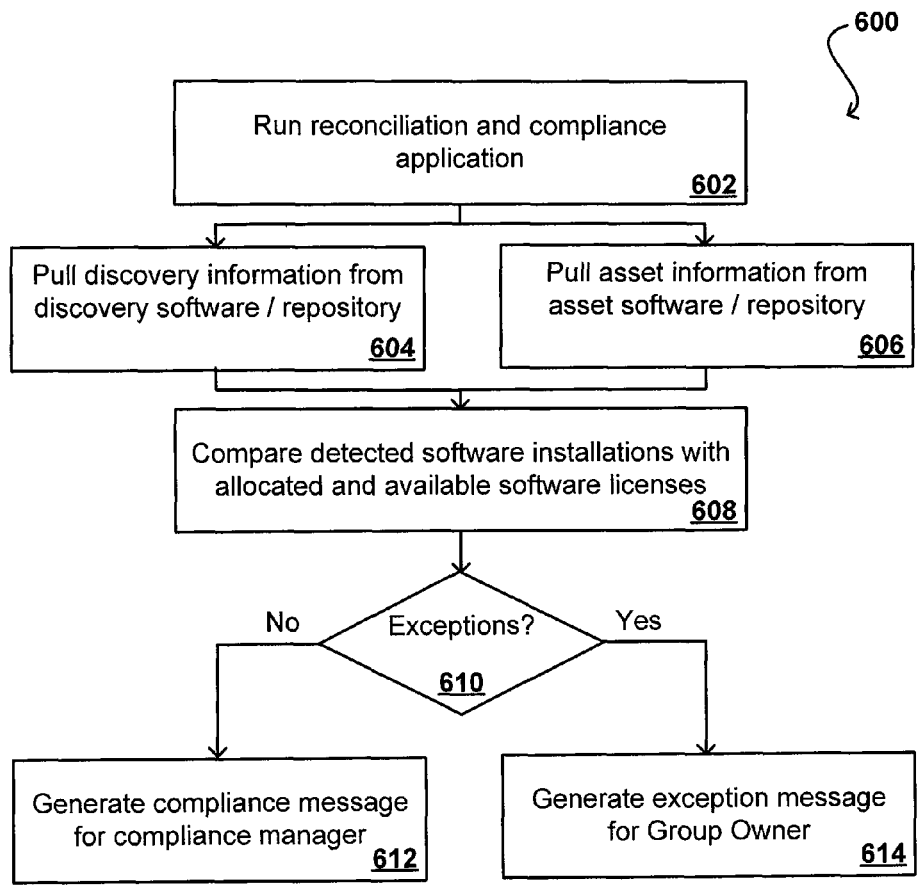
FIG. 6 illustrates steps of a method for determining software license compliance and exceptions in accordance with one embodiment of the present invention.

After a software package is installed and in compliance, it still is necessary to monitor software license compliance over time. FIG. 6 illustrates steps of an exemplary process 600 for monitoring compliance. In this process, a user can manually run, or configure a system to automatically run, a reconciliation and compliance process 602. In this process, the system can pull discovery information from a discovery application or discovery repository 604, and can pull asset information from an appropriate asset repository 606.

After the information is obtained, the detected software installations can be compared and reconciled with the allocated and available software licenses 608. A determination is made as to whether the Group is in compliance for the monitored software packages, or whether there are any exceptions 610. If there are no exceptions, a message can be generated for a compliance manager or other appropriate user indicating that the Group is in compliance 612.

In one embodiment, the compliance manager is a pagelet or detail component. In some embodiments no message is generated if the group is in compliance, and in other embodiments reports can be automatically generated. If there is at least one exception, then a message can be generated informing the appropriate user or Group Owner of the exception 614, and can include instructions for ensuring compliance. In one embodiment, Group Owners are notified using a Software Device Details page and/or component. A message also can be generated for a compliance manager detailing the exception.

Figure 7:
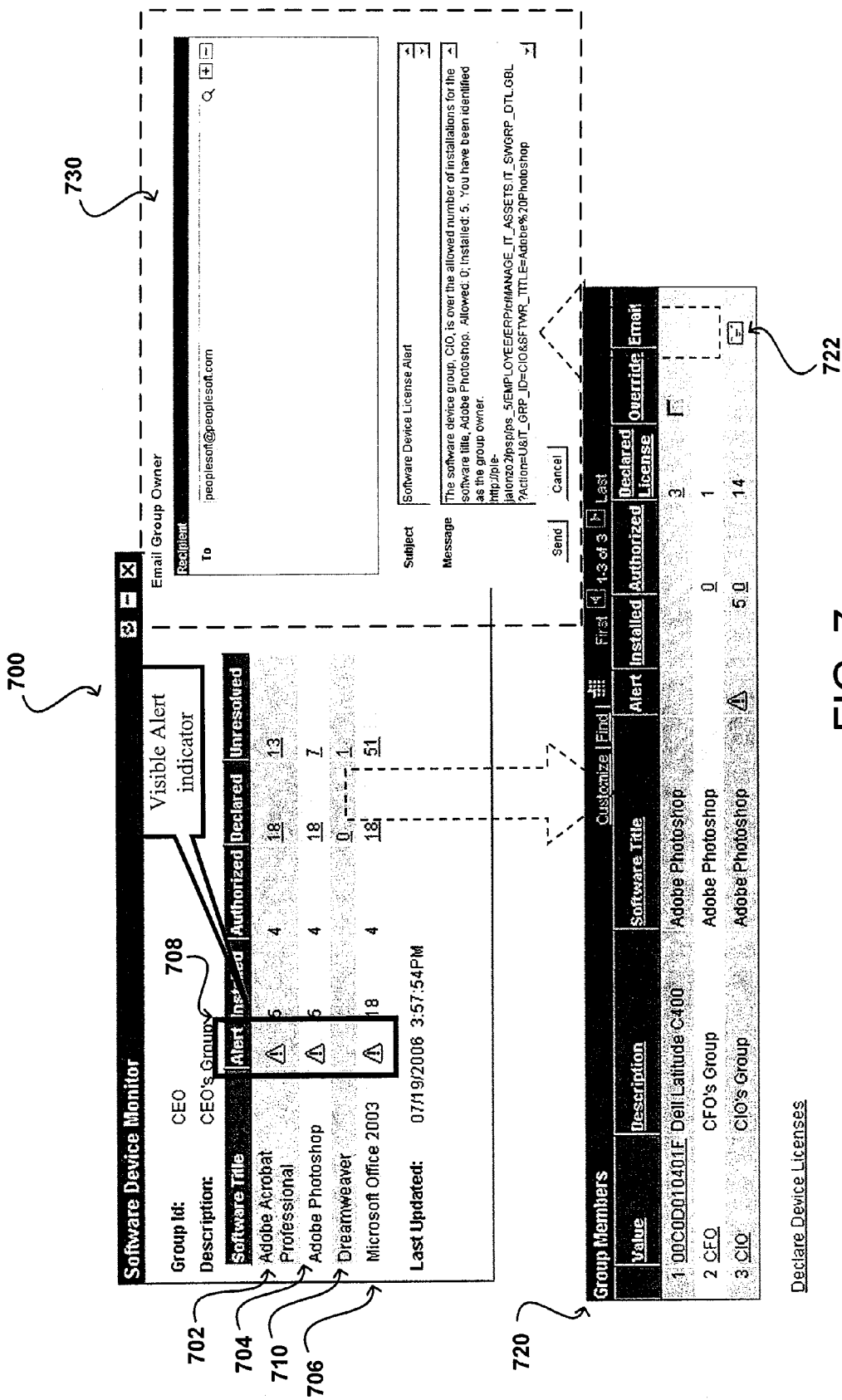
FIG. 7 illustrates an exemplary interface that can be used to handle license exceptions in accordance with one embodiment of the present invention.

FIG. 7 illustrates an example of an interface 700 that can be used to visually monitor software license compliance for a selected group. It should be understood that an entire enterprise can be set as a top level group, wherein compliance for the entire enterprise can be readily determined. In this example, a compliance check is run to determine compliance at the current point in time. In this interface 700, any software package detected to be at least potentially out of compliance is displayed. For example, three software titles 702, 704, 706 are shown to be out of compliance for having more installations than are authorized. For each of these, a visual indicator 708 is displayed so that the user can quickly tell which packages are out of compliance. Other packages 710 may be listed that are not necessarily out of compliance, but where at least one unresolved issue is detected.

If the user wants more information on a particular package shown to be out of compliance, the user can select that package (such as by double clicking on the package title) to bring up a separate screen, window, panel, or other interface portion 720. In this interface portion, the user can view the different members or sub-groups having authorizations or installations. Here, the user can quickly see that the CIO subgroup has five installations, even though that group has no authorizations for that software. The user then can do any of several options. For example, a Group Owner can purchase and/or allocate additional licenses if available. Alternatively, the user can select an email option 722 that can generate an email message 730 to send to the sub-group owner of the CIO group indicating how many licenses were allocated and how many instances are presently installed. When a software package is determined to be out of compliance, a user logging into an ITAM application can see a visual from a high level metric pagelet. In other embodiments, a message or notification is sent when a package is determined to be out of compliance. Different messages can be sent for different circumstances. For example, if the compliance occurs at a lower level of the hierarchy, but the overall group (higher level) is still within the allotted amount of licenses, a message might be sent that a particular group or sub-group is over its allotted amount, but that the company is not yet out of compliance overall. This allows a Group Owner, for example, to either alter the uses of that sub-group or re-allocate licenses to cover the usage of that group. Such an approach helps companies to better utilize existing resources instead of unnecessarily purchasing additional licenses for a sub-group when the overall group has available licenses.

The monitoring can also be configured to occur periodically, such as every night at 2:00. In this way, a compliance exception can be detected within 24 hours and a Group Owner can have a message waiting first thing in the morning to indicate that there is an issue to be handled. In other embodiments, machines can be configured to send information to the discovery system at startup, as devices can otherwise be offline during a discovery scan. Callbacks also can be used as necessary to obtain information from devices that were offline during the scan. In the meantime, information for each such device can be used from the most recent scan.

Figure 8:
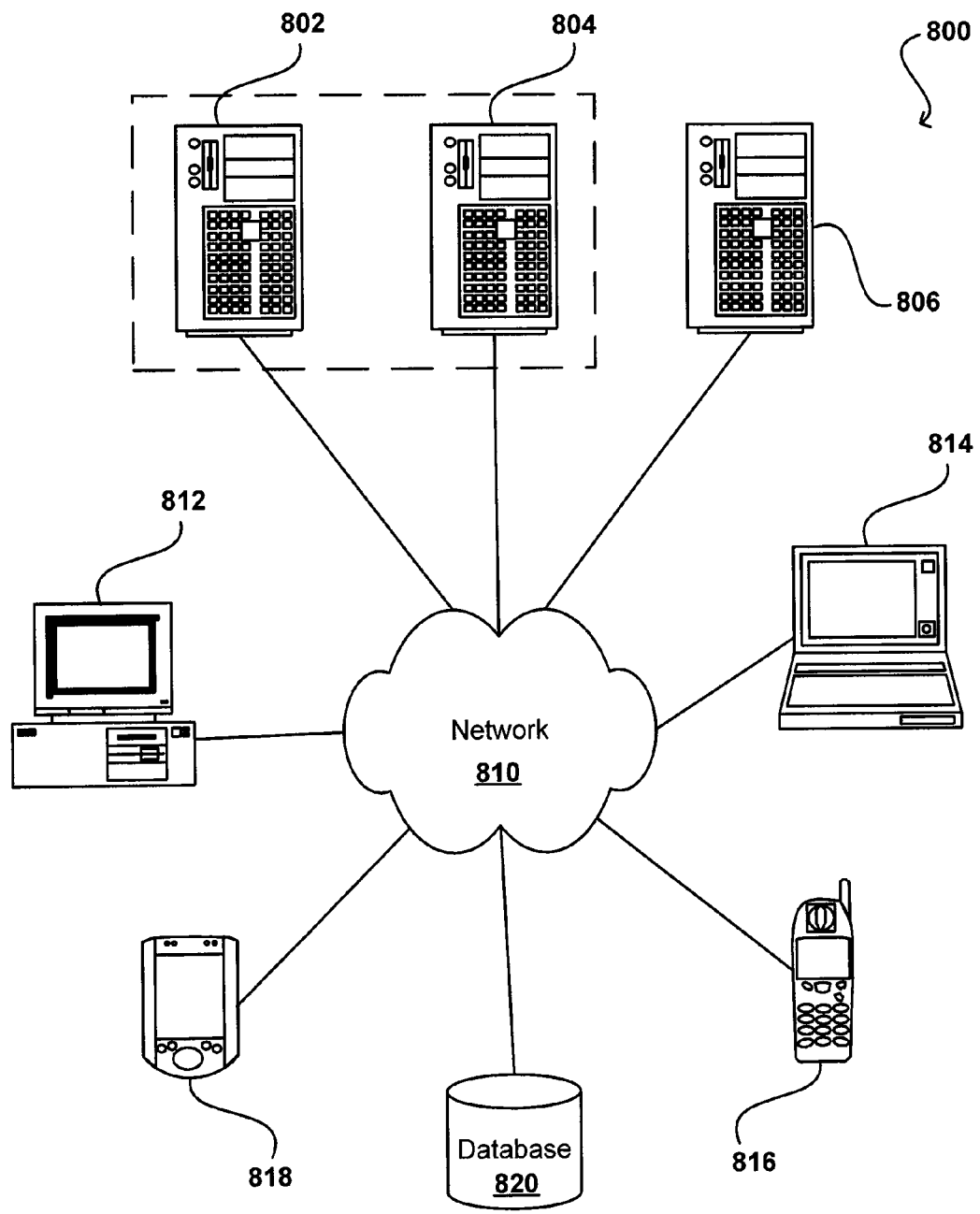
FIG. 8 illustrates components of an exemplary operating environment that can be used in accordance with various embodiments of the present invention.

FIG. 8 is a block diagram illustrating components of an exemplary operating environment in which various embodiments of the present invention may be implemented. The system 800 can include one or more user computers, computing devices, or processing devices 812, 814, 816, 818, which can be used to operate a client, such as a dedicated application, web browser, etc. The user computers 812, 814, 816, 818 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 812, 814, 816, 818 may also have any of a variety of applications, including one or more development systems, database client and/or server applications, and Web browser applications. Alternatively, the user computers 812, 814, 816, 818 may be any other electronic device, such as a thin-client computer, Internet-enabled gaming system, and/or personal messaging device, capable of communicating via a network (e.g., the network 810 described below) and/or displaying and navigating Web pages or other types of electronic documents. Although the exemplary system 800 is shown with four user computers, any number of user computers may be supported.

In most embodiments, the system 800 includes some type of network 810. The network may be any type of network familiar to those skilled in the art that can support data communications using any of a variety of commercially-available protocols, including without limitation TCP/IP, SNA, IPX, AppleTalk, and the like. Merely by way of example, the network 810 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 802, 804, 806 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 806) may be dedicated to running applications, such as a business application, a Web server, application server, etc. Such servers may be used to process requests from user computers 812, 814, 816, 818. The applications can also include any number of applications for controlling access to resources of the servers 802, 804, 806.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 812, 814, 816, 818. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 812, 814, 816, 818.

The system 800 may also include one or more databases 820. The database(s) 820 may reside in a variety of locations. By way of example, a database 820 may reside on a storage medium local to (and/or resident in) one or more of the computers 802, 804, 806, 812, 814, 816, 818. Alternatively, it may be remote from any or all of the computers 802, 804, 806, 812, 814, 816, 818, and/or in communication (e.g., via the network 810) with one or more of these. In a particular set of embodiments, the database 820 may reside in a storage-area network ("SAN") familiar to those skilled in the art. Similarly, any necessary files for performing the functions attributed to the computers 802, 804, 806, 812, 814, 816, 818 may be stored locally on the respective computer and/or remotely, as appropriate. In one set of embodiments, the database 820 may be a relational database, such as Oracle 10 g, that is adapted to store, update, and retrieve data in response to SQL-formatted commands.

Figure 9:
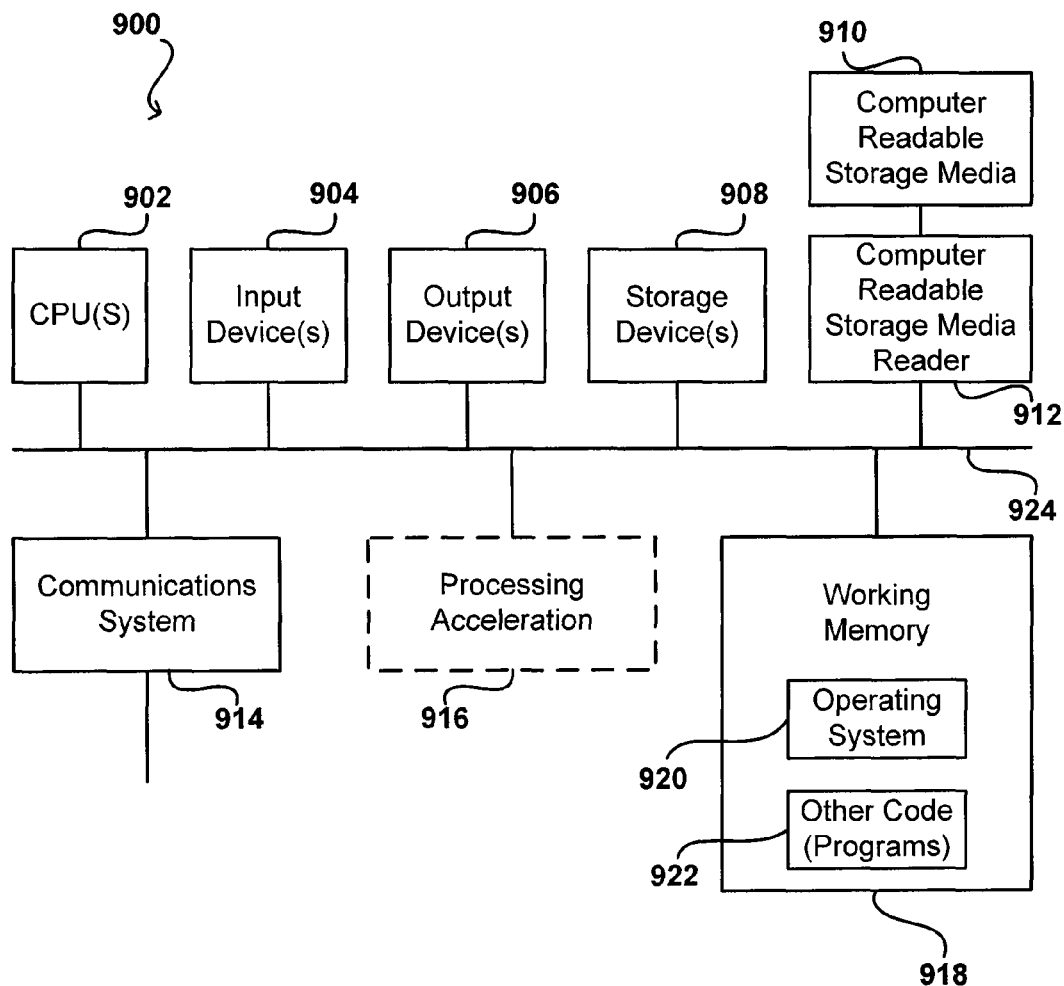
FIG. 9 illustrates components of an exemplary computer system that can be used in accordance with various embodiments of the present invention.

FIG. 9 illustrates an exemplary computer system 900, in which various embodiments of the present invention may be implemented. The system 900 may be used to implement any of the computer systems described above. The computer system 900 is shown comprising hardware elements that may be electrically coupled via a bus 924. The hardware elements may include one or more central processing units (CPUs) 902, one or more input devices 904 (e.g., a mouse, a keyboard, etc.), and one or more output devices 906 (e.g., a display device, a printer, etc.). The computer system 900 may also include one or more storage devices 908. By way of example, the storage device(s) 908 can include devices such as disk drives, optical storage devices, solid-state storage device such as a random access memory ("RAM") and/or a read-only memory ("ROM"), which can be programmable, flash-updateable and/or the like.

The computer system 900 may additionally include a computer-readable storage media reader 912, a communications system 914 (e.g., a modem, a network card (wireless or wired), an infra-red communication device, etc.), and working memory 918, which may include RAM and ROM devices as described above. In some embodiments, the computer system 900 may also include a processing acceleration unit 916, which can include a digital signal processor DSP, a special-purpose processor, and/or the like.

The computer-readable storage media reader 912 can further be connected to a computer-readable storage medium 910, together (and, optionally, in combination with storage device(s) 908) comprehensively representing remote, local, fixed, and/or removable storage devices plus storage media for temporarily and/or more permanently containing, storing, transmitting, and retrieving computer-readable information. The communications system 914 may permit data to be exchanged with the network and/or any other computer described above with respect to the system 900.

The computer system 900 may also comprise software elements, shown as being currently located within a working memory 918, including an operating system 920 and/or other code 922, such as an application program (which may be a client application, Web browser, mid-tier application, RDBMS, etc.). It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for managing software license compliance for an entity, comprising:

defining at least one device group, the device group including a plurality of devices each capable of running an instance of at least one software package and further assigning a group owner responsible for those instances running on those devices by searching for an identifier for the group owner and dynamically selecting associated device to fully source the at least one device group, and wherein fully sourcing the at least one device group further includes using an asset repository management (ARM) database in which a grid is auto-populated with assets where the identifier for the group owner is an asset custodian of record in the ARM database, which is completed independent of whether an initial set of members is dynamically added;

obtaining discovery information for each of the devices of the device group, the discovery information including information about each device and any software package active on the device;

based on the discovery information, determining that at least one of the devices in the device group includes a plurality of virtual central processing units (CPUs);

obtaining asset information indicating the number of licenses available to the device group for each software package and that at least one of the licenses requires an individual license for each of the plurality of CPUs;

associating each license with a specific virtual CPU, wherein in the event that one or more of the virtual CPUs is removed the associated license will also be removed;

comparing the discovery information and the asset information to determine any software packages where the number of instances of a software package or the number of CPUs running on the at least one device exceeds the number of licenses for that software package and generating an exception in response thereto; and notifying the group owner of any generated exception.

2. The method according to claim 1, wherein:

notifying the group owner includes at least one of generating a report, generating an alert, and sending a message to the group owner.

3. The method according to claim 2, further comprising:

notifying any user, sub-group owner, or device owner in the device group of an applicable exception.

4. The method according to claim 1, further comprising:

adding at least one sub-group to the device group, each sub-group including at least one device capable of running an instance of the at least one software package and further including a sub-group owner responsible for those instances running on those devices.

5. The method according to claim 4, wherein:

the sub-groups and devices in the device group form a hierarchy of responsibility in the device group.

6. The method according to claim 5, further including:

dynamically adding any device at a bottom level of the hierarchy and manually adding any sub-group at a higher level.

7. The method according to claim 1, further comprising:

allowing the group owner to automatically add at least one of a device, user, and sub-group to the device group.

8. The method according to claim 1, wherein:

defining at least one device group includes dynamically sourcing the group using information from an asset repository.

9. The method according to claim 1, further comprising:

allowing the group owner to allocate available licenses for any exception in order to remove the exception.

10. The method according to claim 1, further comprising:

allowing the group owner to purchase additional licenses and allocate the additional licenses.

11. The method according to claim 1, further comprising:

sending a message to a device owner to uninstall a software instance in the case of an exception.

12. The method according to claim 1, further comprising:

updating an asset repository after comparing the discovery information and the asset information.

13. A system for managing software license compliance for an entity, the system including a processor operable to execute instructions and a data storage medium for storing the instructions which, when executed by the processor, cause the processor to:

define at least one device group, the device group including a plurality of devices each capable of running an instance of at least one software package and further assigning a group owner responsible for those instances running on those devices by searching for an identifier for the group owner and dynamically selecting associated device to fully source the at least one device group, and wherein fully sourcing the at least one device group further includes using an asset repository management (ARM) database in which a grid is auto-populated with assets where the identifier for the group owner is an asset custodian of record in the ARM database, which is completed independent of whether an initial set of members is dynamically added;

obtain discovery information for each of the devices of the device group, the discovery information including information about each device and any software package active on the device;

based on the discovery information, determine that at least one of the devices in the device group includes a plurality of virtual central processing units (CPUs);

obtain asset information indicating the number of licenses available to the device group for each software package and that at least one of the licenses requires an individual license for each of the plurality of CPUs;

associate each license with a specific virtual CPU, wherein in the event that one or more of the virtual CPUs is removed the associated license will also be removed;

compare the discovery information and the asset information to determine any software packages where the number of instances of a software package or the number of CPUs running on the at least one device exceeds the number of licenses for that software package and generating an exception in response thereto; and notify the group owner of any generated exception.

14. The system according to claim 13, wherein the instructions, when executed by the processor, further cause the processor to:

notify the group owner by at least one of generating a report, generating an alert, and sending a message to the group owner.

15. The system according to claim 13, wherein the instructions, when executed by the processor, further cause the processor to:

add at least one sub-group to the device group, each sub-group including at least one device capable of running an instance of the at least one software package and further including a sub-group owner responsible for those instances running on those devices.

16. The system according to claim 15, wherein the instructions, when executed by the processor, further cause the processor to:
dynamically add any device at a bottom level of a hierarchy and allow a user to manually add any sub-group at a higher level of the hierarchy where the sub-groups and devices in the device group form a hierarchy of responsibility in the device group.

17. The system according to claim 13, wherein the instructions, when executed by the processor, further cause the processor to:
allow the group owner to automatically add at least one of a device, user, and sub-group to the device group.

18. The system according to claim 13, wherein the instructions, when executed by the processor, further cause the processor to:
allow the group owner to allocate available licenses for any exception in order to remove the exception.

19. The system according to claim 13, wherein the instructions, when executed by the processor, further cause the processor to:
automatically allocate any available licenses from other sub-groups in the device group in the case of an exception.

20. A computer program product embedded in a non-transitory computer readable medium for managing software license compliance for an entity, comprising:
program code for defining at least one device group, the device group including a plurality of devices each capable of running an instance of at least one software package and further assigning a group owner responsible for those instances running on those devices by searching for an identifier for the group owner and dynamically selecting associated device to fully source the at least one device group, and wherein fully sourcing the at least one device group further includes using an asset repository management (ARM) database in which a grid is auto-populated with assets where the identifier for the group owner is an asset custodian of record in the ARM database, which is completed independent of whether an initial set of members is dynamically added;
program code for obtaining discovery information for each of the devices of the device group, the discovery information including information about each device and any software package active on the device;
based on the discovery information, program code for determining that at least one of the devices in the device group includes a plurality of virtual central processing units (CPUs);
program code for obtaining asset information indicating the number of licenses available to the device group for each software package and that at least one of the licenses requires an individual license for each of the plurality of CPUs;
program code for associating each license with a specific virtual CPU, wherein in the event that one or more of the virtual CPUs is removed the associated license will also be removed;
program code for comparing the discovery information and the asset information to determine any software packages where the number of instances of a software package or the number of CPUs running on the at least one device exceeds the number of licenses for that software package and generating an exception in response thereto; and
program code for notifying the group owner of any generated exception.

21. The computer program product according to claim 20, further comprising:
program code for notifying the group owner by at least one of generating a report, generating an alert, and sending a message to the group owner.

22. The computer program product according to claim 20, further comprising:
program code for adding at least one sub-group to the device group, each sub-group including at least one device capable of running an instance of the at least one software package and further including a sub-group owner responsible for those instances running on those devices.

23. The computer program product according to claim 22, further comprising:
program code for dynamically adding any device at a bottom level of a hierarchy and allow a user to manually add any sub-group at a higher level of the hierarchy where the sub-groups and devices in the device group form a hierarchy of responsibility in the device group.

24. The computer program product according to claim 20, further comprising:
program code for allowing the group owner to automatically add at least one of a device, user, and sub-group to the device group.

25. The computer program product according to claim 20, further comprising:
program code for allowing the group owner to allocate available licenses for any exception in order to remove the exception.

26. The computer program product according to claim 20, further comprising:
program code for automatically allocating any available licenses from other sub-groups in the device group in the case of an exception.

* * * * *

UNITED STATES PATENT AND TRADEMARK OFFICE
CERTIFICATE OF CORRECTION

PATENT NO. : 8,407,669 B2  
APPLICATION NO. : 11/828234  
DATED : March 26, 2013  
INVENTOR(S) : Yee et al.

Page 1 of 1

It is certified that error appears in the above-identified patent and that said Letters Patent is hereby corrected as shown below:

In the Specifications:

In column 12, line 20, delete "modern," and insert -- modem, --, therefor.

Signed and Sealed this  
Ninth Day of July, 2013

Teresa Stanek Rea  
*Acting Director of the United States Patent and Trademark Office*